UNITED STATES PATENT OFFICE.

JOHN L. BOGY, OF SAINT GENEVIEVE, MISSOURI.

IMPROVEMENT IN SURVEYING-INSTRUMENTS.

Specification forming part of Letters Patent No. 147,472, dated February 17, 1874; reissue No. 6,792, dated December 14, 1875; application filed December 2, 1875.

*To all whom it may concern:*

Be it known that I, JOHN L. BOGY, of the city and county of Saint Genevieve, State of Missouri, have invented new and useful Improvements in Surveying-Instruments, of which the following is a full, clear, and exact description, reference being had to the accompanying drawing, making a part of this specification.

Parts of the legs of the main brace are broken away. The dotted lines indicate the position of the vertical limb of the square when moved up.

The object of the present invention is to provide means by which vertical and horizontal distances can be readily measured.

Referring to the accompanying drawing, A A′ represent legs, preferably of a curved shape, as shown. Their upper ends are similarly pivoted in a head, B, and the legs are opened to a desired span and there fastened. In the present case the span is ten feet. C represents a main brace, that serves to hold the lower ends of the legs apart. Its length is equal to the distance between the outer faces of the legs. The brace is marked off into feet and subdivisions thereof for the purpose of measuring fractional distances, in the manner hereinafter described. It is also provided at either end with extensions $c\,c^1$, which can be opened out horizontally, so as to lengthen the main brace, when it is desirable, to measure distances slightly longer than the length of the main brace.

D represents another brace, extending from the head B to the center of the main brace. For the better adjustment of the legs A A′ to the desired span, the main brace, at the places of connnection with the legs, is provided with slots $c^2\,c^2$. There are additional braces E E′ running from the lower ends of the legs to the main brace, which, in practice, is preferably arranged eighteen inches from the lower ends of the legs. F represents a limb or semicircle, graduated into degrees and minutes, beginning at the middle of the limb and numbering from 0° to 90°, both to the right and to the left. The center of the semicircle coincides with the center of the head B. It is arranged with its 0° point vertically beneath the head B, and is fastened to the brace D and head B. H represents a larger semicircle, arranged similarly to the limb F, and also is fastened to the head and brace D. Opposite the points of contact with the legs A A′ it is provided with slots $f\,f'$, in which studs, with which the legs are provided, engage. This last described semicircle H has marked thereon four series of divisions, viz, I, J, K and L. The first two, I and J, have reference to a span or opening between the outer faces of the lower ends of the legs of the instrument of ten feet, and are, respectively, what I term the sine and the cosine series. The last two named, viz., the K and L divisions, have reference to a span of fifteen feet, and are, also, a sine and a cosine series. The positions of the division-lines in the several series mentioned, viz., I J K L, are determined as follows: Beginning at 0°, at the middle of the semicircle, and proceeding, either to the right or to the left, to the extremities of the semicircle, for the two sine series I and K, the spaces between the lines marked 1 2 3, &c., constantly increase toward the extremities of the semicircle in the same ratio as a series of natural sines, and, for the cosine series, J and L, beginning at the extremities of the semicircle, respectively, and proceeding toward the center of the limb, the spaces between the lines marked 1 2 3, &c., constantly increase toward the middle of the semicircle in the same ratio as a series of natural cosines. But, while increasing, as stated, all of the divisions above named bear an inverse relation to the span to which the legs of the instrument are opened—that is, the longer the span the shorter the divisions. The actual measurement shown in the sine and cosine series in the present application correspond to the actual sines and cosines in circles whose radii are respectively ten and fifteen.

M represents a pendulum, pivoted at the center of the head B and swinging freely against the faces of the two semicircles F and H. Opposite the semicircle F it is provided with a vernier, N, and opposite the semicircle H it is provided with a hair-line, O, and, respectively, as either semicircle is used, to obtain more accurate readings.

P represents a square, that is detachable from the main portion of the instrument. It is composed of two parts or limbs, R and S, which are arranged to slide vertically on each other. The vertical limb S is graduated. The horizontal part R embraces and slides upon the main brace C.

The operation of the invention is as follows: Resting either leg of the device upon the initial point of the survey, and holding the device plumb, laterally considered, and in the direction of the objective point, let the other leg rest upon the ground, or first station after leaving the initial point. Then note the positions of the semicircles, or either of them, with relation to the pendulum. The difference in level between the positions of the feet of the legs, and also the horizontal distance between them, is determined by a reference either to the semicircle F or to the semicircle H. If by the former, the operator reads the degrees opposite the pendulum, and then refers to a table of natural sines. The sine corresponding to the reading multiplied by the span of the instrument denotes the difference in level. A reference to a table of cosines, and similarly treated, determines the horizontal distance. To learn the distances by means of the semicircle H, (which method, for ordinary purposes, is sufficient, and also the quicker operation,) the procedure is as follows: The position of the pendulum in the I or sine series is noted. The number covered denotes the actual difference in level of the positions of the legs. The position of the pendulum in the J or cosine series denotes the actual horizontal distance between the positions of the legs. The other (lower) series, viz., K and L, are used when the span of the instrument is fifteen feet. For greater accuracy the vernier N on the pendulum is used in connection with the semicircle F, and the hair-line O in connection with the semicircle H. When the final point of the survey is at a distance greater than that of a single span of the instrument the above procedures, or either thereof, are repeated until such final point is reached. And when such final point does not coincide with the span of the instrument, or any multiple thereof, (as is usually the case,) resort is had (when the semicircle F is used) to the following: Slide the square P on the main brace until over the final point, one leg of the instrument resting on the last station before the final point. The two parts of the square are then adjusted vertically to bring that point of the main brace, at which the square is fastened, the same distance above the ground or final point that the main brace is above the ends of the legs. Then, after noting the relative position of pendulum and limb, and after referring (as above) to the natural sine and cosine corresponding thereto, a multiplication of such sine and cosine, respectively, by the fractional part of the span, as indicated by the postiion of the square, will, respectively, denote the vertical and the horizontal distances.

When the semicircle H is employed in connection with a fractional part of the span the operation is as follows: From the last station before reaching the objective point, and also from the objective point, describe, with the legs of the instrument, intersecting arcs. From the point of their intersection determine with the instrument the levels of the first two mentioned points as compared with the said point of intersection. The difference in these two levels is the difference in level between the objective point and the last station before it.

Having ascertained the difference in level, the horizontal distance is determined as follows: The square is slipped (as above) on the main brace until over the final point, one leg of the instrument resting on the last station. The square is then adjusted vertically to bring the point of attachment to the main brace the same distance above the final point that the main brace is above the end of the leg. Then as the difference in level of the two legs is to the horizontal distance between them, so is the difference in level between the final point and the last station before it to the answer.

Having described my invention, what I claim is—

1. The hereinbefore-described instrument, consisting of the head B, legs A A′, main brace C, semicircle F, pendulum M, and square P, combined and operating substantially as described.

2. The hereinbefore-described instrument, consisting of the head B, legs A A′, main brace C, semicircle H pendulum M, and square P, combined and operating substantially as shown.

3. The legs A A′, head B, main brace C, semicircles F and H, pendulum M, and square P, combined and operating substantially as described.

JOHN L. BOGY.

Witnesses:
JULES B. GUIGNON,
PAUL L. LEMPKY,
JOHN L. BOVERIE.